United States Patent [19]

Simpson

[11] Patent Number: 4,516,371
[45] Date of Patent: * May 14, 1985

[54] INSULATION AND PANELING APPARATUS AND METHOD

[75] Inventor: Harold G. Simpson, Oklahoma City, Okla.

[73] Assignee: Encon Products, Inc., Oklahoma City, Okla.

[*] Notice: The portion of the term of this patent subsequent to May 18, 1999 has been disclaimed.

[21] Appl. No.: 322,165

[22] Filed: Nov. 17, 1981

Related U.S. Application Data

[63] Continuation-in-part of Ser. No. 93,173, Nov. 13, 1979, Pat. No. 4,329,823.

[51] Int. Cl.³ .............................................. E04B 1/00
[52] U.S. Cl. ....................................... 52/269; 52/508; 52/409; 52/410; 52/404; 52/747
[58] Field of Search ................ 52/508, 409, 410, 404, 52/269, 478, 543, 408, 407, 506, 480, 698, 747; 411/387

[56] References Cited

U.S. PATENT DOCUMENTS

| 2,999,571 | 9/1961 | Huber | 52/508 X |
| 3,054,482 | 9/1962 | Lassen | 52/508 X |
| 3,394,516 | 7/1968 | Taylor et al. | 52/410 |
| 3,474,583 | 10/1969 | Manias | 52/404 X |
| 3,900,995 | 8/1975 | Ehrenberg | 52/480 X |
| 3,924,508 | 12/1975 | DeCaro | 411/387 |
| 3,998,019 | 12/1976 | Reinwall, Jr. | 52/478 |
| 4,081,938 | 4/1978 | Bertacchi et al. | 52/410 |
| 4,213,282 | 7/1980 | Heckelsberg | 52/478 X |
| 4,250,678 | 2/1981 | Skuran | 52/478 |
| 4,314,428 | 2/1982 | Bromwell | 52/747 X |

Primary Examiner—Carl D. Friedman
Attorney, Agent, or Firm—Bill D. McCarthy

[57] ABSTRACT

An insulation and paneling apparatus comprising a first panel member supported by the inner frame of a pre-engineered building, a layer of compressible insulation adjacent to the first panel member, a spacer member supported over the insulation layer by a plurality of fastener members penetrating the insulation and disposing the spacer member a predetermined distance from the first panel member, and a second panel member supported by the spacer member, the fastener members designed such that the insulation substantially retains its prepenetration characteristics and designed to attach to either the first panel member or the inner building frame.

29 Claims, 13 Drawing Figures

INSULATION AND PANELING APPARATUS AND METHOD

This is a continuation-in-part application to a U.S. patent application entitled SUPPORT SPACER APPARATUS, Ser. No. 93,173, filed Nov. 13, 1979, and now U.S. Pat. No. 4,329,823.

BACKGROUND OF THE INVENTION

1. Field of the Invention

The present invention relates generally to the field of improving heat transfer resistance of a paneling system in which insulation material is confined between construction members, and more particularly but not by way of limitation, to a paneling system providing improved insulating qualities to pre-engineered buildings and the like.

2. Discussion

The pre-engineered building industry is experiencing an increasingly greater share of the construction industry budget throughout the world. The established method of erecting the roof or wall of a pre-engineered building is to erect the primary structural members; attach the secondary structural members to the primary structural members; secure the appropriate bracing members; roll blanket-type insulation across the secondary structural members; dispose panel members over the insulation; and connect the panel members and the secondary structural members together by fasteners that penetrate the insulation. The securement of panel members to the secondary structure members is performed by a workman who stands on top of one of the panel members and inserts fasteners through the panel member to attach it to the underlying secondary structural members.

In my patent entitled SUPPORT SPACER APPARATUS, U.S. Pat. No. 4,329,823, filed Nov. 13, 1979, and assigned Ser. No. 093,173, I discussed problems that occur in the pre-engineered building industry in the construction of such buildings in the above stated manner. That is, as the fasteners are installed through panel members, the underlying insulation is compressed between the panel members and the secondary structural members, resulting in undesirable reduction in thermal effectiveness of the insulation. Since the primary purpose of the fasteners is to secure the panel members to the secondary structural members and to transfer stress from the panel members, movement of the panel members relative to the secondary structural members during the life of the building is detrimental thereto because of the looseness which occurs around the fasteners, and it is difficult, if not impossible, to maintain watertightness at the points where the fasteners penetrate the panel members.

Taylor, U.S. Pat. No. 3,394,516, taught the use of spacers between the panel members and the secondary structural members to prevent panel members from being pulled so close to the secondary structural members as to crush the insulation. The Taylor spacer had a plurality of pointed legs that served to penetrate the insulation, and sheet metal screws were used to secure the panel members to the secondary structural members through the spacer. However, while the Taylor spacer substantially reduced the amount of compressive reduction of insulation, the pointed legs of the Taylor spacer afforded a heat conducting bridge between the secondary structural members and the panel members. Further the Taylor spacer, which was independent of the fasteners, permitted movement of the overlying panel members, and this movement could eventually lead to deterioration of the kind mentioned above. Other difficulties with the Taylor spacer are discussed in my previously mentioned patent.

Another prior art teaching is the sandwich panel of which there are numerous types; for example, the insulated wall structure of Manias, U.S. Pat. No. 3,474,583, features an inner metal sheath and an outer metal sheath interconnected by spacer members and lined with insulating material. Numerous designs of such double sheath structures are offered in the prior art with the differences being in the materials used and the means employed to physically connect the sheaths while thermally isolating them. While these sandwich panels have met with a measure of success, they have not had universal acceptance due to their excessive cost and relative complex installation requirements. Additionally, sandwich panels are used only for new construction, with little or no value in retrofit construction applications.

A novel support spacer apparatus is taught in my above-mentioned patent which provides a system in which stress imparted to the exterior panel members is transferred through the underlying compressible insulation material without affecting the thermal characteristics of the compressible material, and in which the integrity of the building envelope structure is substantially unaffected from such transfer of stress. The support spacer apparatus taught in my Patent comprised a spacer member having a support surface and a plurality of fastener apertures extending therethrough; a plurality of fasteners assemblies, each such fastener assembly comprising a fastener member having a first end and a second end, the fastener member extendable through one of the fastener apertures and the second end attachable to an underlying secondary structural member by applying energy to the first end of the fastener member, with the dimension of the fastener member being determined so that the first end is caused to exert a restraining force against the support surface of the spacer member in an attached position of the spacer member with the underlying secondary structural member.

SUMMARY OF THE INVENTION

My previously mentioned Patent taught a support spacer apparatus for supporting a structure at a predetermined distance from a substrate, thus providing a system in which stresses imparted to the exterior of a building structure are transferred through compressible material without compromising the thermal characteristics of the compressible material, and in which the integrity of the structure is substantially unaffected from such transfer of stress.

The insulation and paneling apparatus and method of the present invention comprises a first panel member (or a previously existing panel member) supported by the inner frame of a buiding; a layer of compressible insulation adjacent to the first panel member (or previously existing panel member); a spacer member having a support surface and a plurality of fastener apertures, the spacer member having a plurality of fastener assemblies, each fastener assembly comprising a fastener member having a first end and a second end, the fastener member extendable through one of the fastener apertures and the second end attachable to the building frame by applying energy to the first end of the fastener member, with the dimension of the fastener member being determined so that the first end is caused to exert a restraining force against the support surface of the spacer member in an attached position of the spacer member with building frame; and a second panel member supported by the spacer member. Each fastener assembly also comprises a stay member which provides a countering force to the restraining force against the spacer member so that the support surface of the spacer member is spatially disposed at a predetermined distance from the first panel member.

Accordingly, an object of the present invention is to provide an improved insulation and paneling apparatus and method for enclosing a building structure.

Another object of the present invention is to provide an improved insulation and paneling apparatus and method that achieve the above stated object and which provide for transferring stresses through compressible insulation material without compromising the thermal effectiveness of the compressible insulation material and while maintaining the integrity of supporting structural members.

Another object of the present invention is to provide an improved insulation and paneling apparatus and method that achieve the above stated objects and which offer manufacturing economy, ease of installation and long service life with minimum of upkeep.

Other objects, features and advantages of the present invention will become apparent from the following detailed description when read in conjunction with the drawings and appended claims.

DESCRIPTION

My previously mentioned patent teaches a support spacer apparatus, and the present disclosure is a continuation-in-part disclosure to that patent. Accordingly, some of the disclosure of that patent will also be provided herein.

Figure 1:
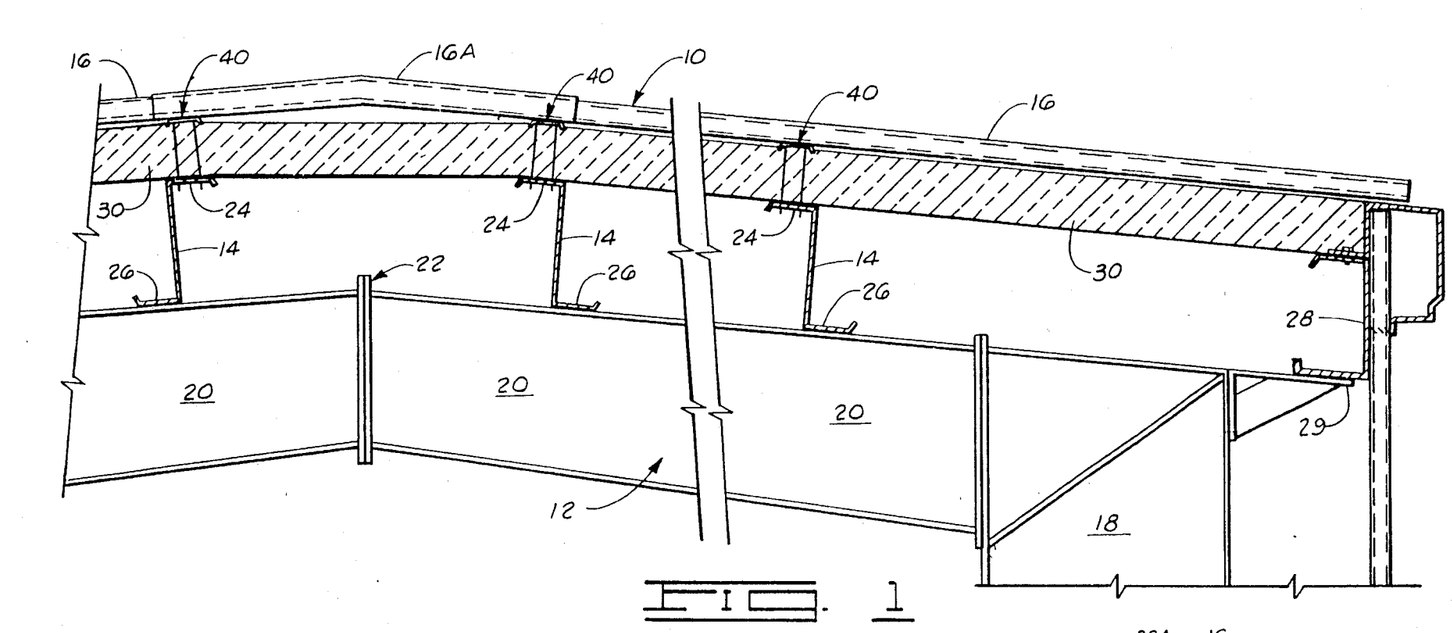
FIG. 1 is a semi-detailed, cutaway end view depiction of a pre-engineered building roof constructed in accordance with my invention.

Referring to the drawings in general, and in particular to FIG. 1, shown therein and designated by the numeral 10 is a portion of the roof of a pre-engineered building constructed in accordance with established methods of erection and as modified by using the support spacer apparatus of my invention. The pre-engineered building roof 10 comprises, in part, a plurality of primary structural members 12, a plurality of secondary structural members 14, and a plurality of corrugated roof panel members 16. The primary structural members 12 comprise the vertically extending column members 18 and the generally horizontally extending rafter members 20 supported by the column members 18 and interconnecting via conventional bolts (not shown) to form an apex center 22. The secondary structural members 14, sometimes referred to as purlins, are longitudinal members that have oppositely extending flanges 24 and 26, which impart a somewhat Z-shaped profile to the purlins. The primary structural members 12 and the secondary structural members 14 serve to form the inner frame of the pre-engineered building 10.

The roof panel members 16 are fastened indirectly, in the manner described hereinbelow, to the secondary structural members 14 which extend substantially the length of the pre-engineered building roof 10 and which are connected to the rafter members 20 via conventional connectors (not shown). Eave struts 28 are supported along the edge of the building by connecting the eave struts 28 to outwardly extending support members 29 which are connected via conventional connectors (not shown) to the vertical column members 18. Other details of the pre-engineered building depicted in FIG. 1 are either not described or omitted from the drawings in order to simplify the present disclosure.

The established method for insulating a pre-engineered building roof, such as the roof 10 in FIG. 1, is to place rolls of insulated material 30 over the purlins 14 so that the insulation is supported by the flanges 24. The roof panel members 16 are then positioned directly on top of the insulation 30 and bolted to the flanges 24 in the manner shown in FIG. 2A.

Figure 2A:
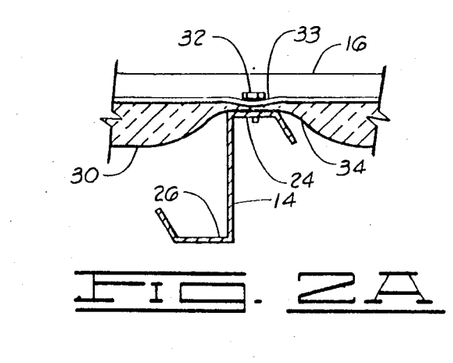
FIG. 2A depicts a profile of compressed insulation as encountered in a prior art installation of a pre-engineered building roof.

In FIG. 2A, a typical prior art connection of the roof panel members 16 to the purlins 14 is shown in which a screw member 32 is extended from the top through the panel member 16 and threadingly engages a predrilled hole in the flange 24 of the underlaying purlin 14. As the screw member 32 is tightened, the panel member is deformed, and as depicted in FIG. 2A, a dimple depression 33 results around the headed end of the screw member 32. This securement of the panel member 16 to the purlin 14 results in the constriction of the insulation 30, as shown at 34, reducing the thickness of the insulation and creating a "thermal short circuit" through the roof panel member 16. That is, excessive heat loss occurs through this and the many other prior art joints similarly constructed, and as a result, a large amount of heat energy is lost through the roof even though it has been insulated. This is evident, by way of illustration, when the roof of a pre-engineered building is covered by snow: the first points at which melting occurs coincide with the connecting joints where the screw members 32 attach the roof to the purlins. This problem is then exacerbated by the melted snow that forms pockets of water in the dimpled depressions 33 about the heads of the screw members 32, resulting in excessive leaks, corrosion and other undesirable problems with the building. All of this is the result of fastening the panel members 16 to the purlins 14 by extending the screw members 32 through and compressing the insulation 30; the insulation 30 is normally compressible mineral or chopped glass fiber insulation (such as Fiberglass), and is reduced to less than 15 percent of its original thickness as it is constricted between the purlin 14 and the panel member 16, and since the effectiveness of the insulation is proportional to the thickness of the insulation, the resistance to heat transfer at the points of constriction 34 is substantially eliminated.

Figure 2B:
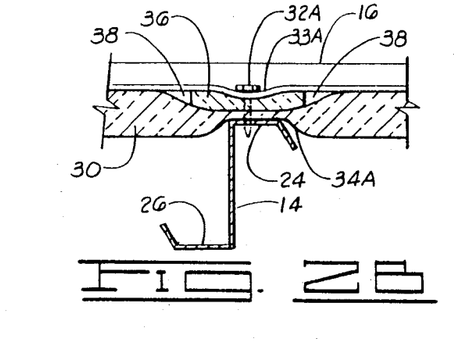
FIG. 2B depicts a profile of a prior art modification to the installation of FIG. 2A, the modification being the inclusion of an insulation board between the roof panel and the insulation.

As noted above, one prior art solution to this heat loss is the provision of an insulation board 36 such as depicted in FIG. 2B, in which like numerals designate those elements which are identical to those depicted in FIG. 2A. The insulation board 36 is disposed above the flange 24 between the insulation 30 and the roof panel member 16 so that the screw member 32A passes through the insulation board 36, through the insulation 30, and attaches to the flange 24. The insulation board 36 serves to spread the compressive force of the fastened roof panel member 16 at the screw members 32 over a greater area of the insulation 30, and although the insulation 30 is constricted at 34A in the same manner as shown in FIG. 2A, the combined thickness of the insulation board 36 and the compressed insulation at the connecting joints is greater; that is, the effective thickness of the insulation at the constriction 34A in FIG. 2B is greater than the effective thickness of the insulation at the constriction 34A in FIG. 2B.

While the arrangement in FIG. 2B is an improvement of that shown in FIG. 2A, there are a number of shortcomings in using the insulation boards such as that depicted by the insulation board 36. The insulation 30 is still compressed and there are voids 38 between the insulation board 36, the roof panel member 16 and the insulation 30, the result of which is even greater deterioration of the insulating quality at the connecting joints. In practice, the insulation board 36 is normally made of a relatively soft material, and the compressive force caused by the screw member 32A usually tends to crush the insulation board, resulting in increased dimpling of the panel member 16, and ponding of water in the exaggerated dimple depressions 33A brings about even greater corrosion at these points. Continued working of the roof because of expansion and contraction can cause continued crushing of the insulation boards at the connecting joints, leading to even worsened leaking conditions as the pressure between the heads of the screw members 32A and the panel members 16 is no longer maintained, and even elastomeric washers, if provided, do not insure that water tight seals will be maintained during the life of the roof.

These problems, for all practical considerations, are eliminated by the application of my invention which permits the secure support of a structure at a predetermined distance above a supporting substrate (the building frame) where a compressible material is disposed between the structure and the substrate, the integrity of the compressible material being substantially maintained following securement of the structure to the substrate. For the case at hand, the supported structure is one or more roof panels, and the supporting substrate will be the building frame as formed by a plurality of purlins as discussed above.

Returning to FIG. 1, it will be noted that the roof panels 16 are supported by a plurality of support spacer apparatus 40 which are secured to the flanges 24 of the purlins 14. That is, in FIG. 1, the roof panels 16 are not attached directly to the underlying purlins as required by established prior art practice and as depicted in both FIG. 2A and FIG. 2B. Rather, the roof panel members 16 shown in FIG. 1 are attached to the plural support spacer apparatuses 40. The support spacer apparatus 40 is attached to the respective purlin 14 via fasteners that extend through the insulation material 30 in a manner made more clear by reference to FIG. 3. While the support spacer apparatus 40 is shown in FIG. 3 in substantially parallel disposition and attached to a single purlin, it will be understood that the support spacer apparatus 40 can be disposed to extend across the underlying purlins and attach to more than one purlin in the manner described herein below.

Figure 3:
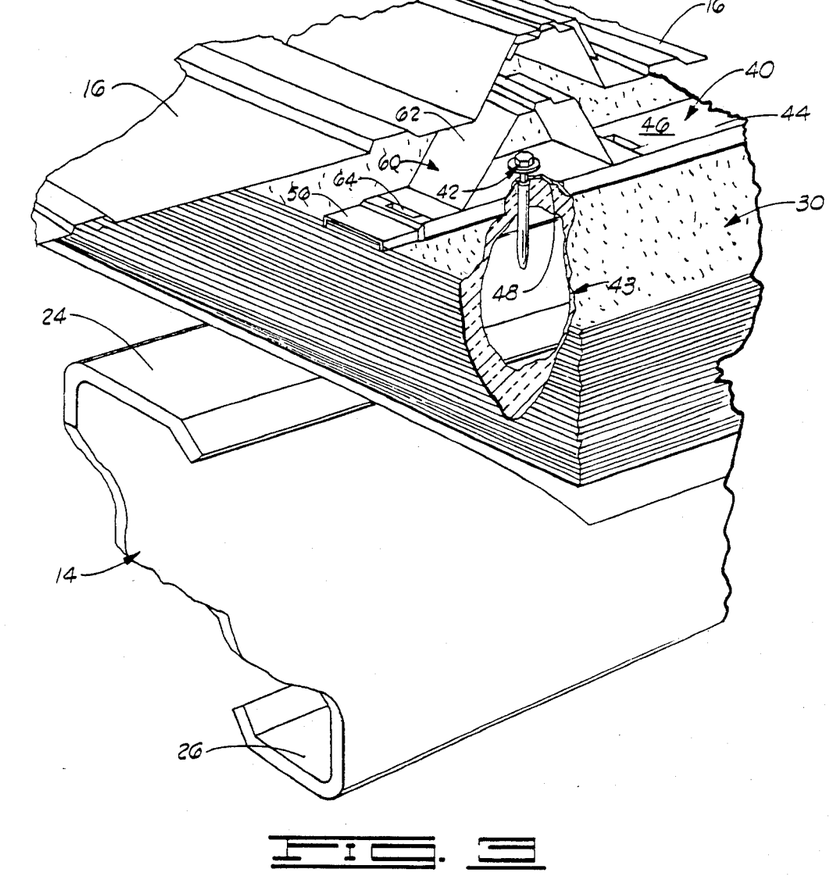
FIG. 3 is a partial cutaway, perspective view of a support spacer apparatus of my invention showing the relative positions of roof panel members to a secondary structural member of a pre-engineered building.

Shown in FIG. 3 is an enlarged portion of a purlin 14 with a portion of insulation material 30 shown supported on the upper flange 24 thereof. A portion of a support spacer apparatus 40 is shown, along with portions of overlapping roof panel members 16 depicted above the support spacer apparatus 40, which is fastened to the flange 24 of the purlin 14 by a fastener assembly 42. The insulation 30 and the support spacer apparatus 40 is shown partially removed at 43 so as to show the fastener assembly 42 more fully in this view.

The support spacer apparatus 40 comprises a channel shaped spacer member 44 having an upper first support surface 46 and a lower, oppositely disposed second support surface 48. The spacer member 44 has a plurality of fastener apertures 50 communicating through it from the first support surface 46 to the second support surface 48, the fastener apertures 50 being best shown in FIG. 4. The fastener assemblies 42 extend through the fastener apertures 50 to attach to the underlying substrate or purlin 14 in the manner described more fully hereinbelow. While the locations of the fastener apertures 50 may assume a variety of layout patterns, the offset pattern shown in FIG. 4 is believed to be beneficial in providing stable securement of the support spacer apparatus 40 to the purlin 14; that is, by staggering the locations of the fastener apertures 50 from side-to-side along the length of the spacer member 44, the support spacer apparatus 40, once attached to the purlin 14 via the fastener assemblies 42, will have greater stability to an imposed load.

Figure 4:
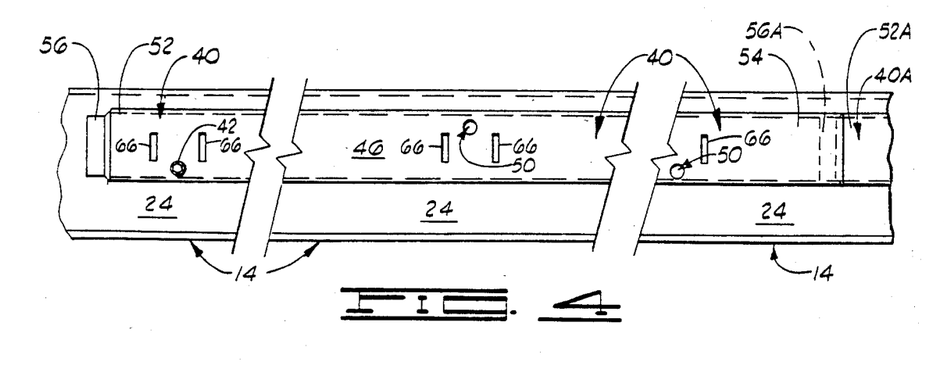
FIG. 4 is a top plan view of the support spacer apparatus of FIG. 3 with the insulation removed to show the secondary structural member beneath the support spacer apparatus.

The support spacer apparatus 40 shown in broken view in FIG. 4 has a first end 52 being shaped in the form of a protruding tang 56. Also shown in FIG. 4 is a second support spacer apparatus 40A which is disposed in end-to-end alignment with the support spacer apparatus 40. The support spacer apparatus 40A is identical in construction detail to the support spacer apparatus 40 and is shown having a protruding tang 56A, extensive from a first end 52A thereof, received in the channel web of the support spacer apparatus 40 at the second end 54. In like manner, the protruding tang 56 of the support spacer apparatus 40 is receivable in another support spacer apparatus (not shown) which will be disposed in end-to-end alignment therewith such that a plurality of support spacer apparatuses interjoin to provide a continuously extending upper or first surface 46 along the length of the supporting purlin 14. This interjoining feature serves to provide stability of the support spacer apparatuses 40 supported by a single purlin 14, and further, this interlocking feature of the support spacer apparatus 40 serves to provide a guide means to a workman as he interlocks, and fastens via a conventional fastener (not shown), each support spacer apparatus 40 to those already attached to the underlying purlin during installation.

Returning to FIG. 3, it will be noted that a panel support bridge 60 is provided at the overlapping edges of adjacent roof panels 16. The panel support bridge 60 has a bridge portion 62 which is supported at its opposite ends on the first support surface 46 by attachment of clip extensions, such as clip 64, disposed in appropriately disposed slots 66 (as shown in FIG. 4). The bridge portion 62 is configured to have a profile which will mate with the overlapping edges of the roof panels 16, and the roof panels 16 are attached to the panel support bridge via conventional bolts (not shown) after a sealant is disposed therebetween.

Each support spacer apparatus 40 has a plurality of fastener assemblies 42 which are designed to penetrate the insulation material 30 and connect to the purlin 14. Shown in FIG. 5 is an enlarged view of one of the fastener assemblies 42 in partial cutaway detail and depicted in an assembled position with the spacer member 44 (but prior to attachment to a substrate or purlin 14).

Figure 5:
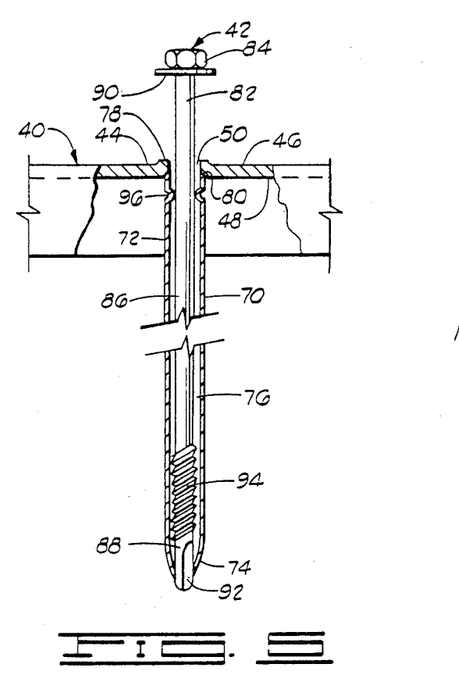
FIG. 5 is a side elevational, partial cutaway view of a fastener assembly constructed in accordance with my invention.

The fastener assembly 42 depicted in FIG. 5 comprises a column member 70 having a first end 72 and a second end 74, the column member 70 also having a bore or channelway 76 extending from the first end 72 to the distal second end 74. Each of the fastener apertures 50 is tabulated such that the internal surface 78 of the fastener aperture 50 is flared away from the first support surface 46 in the manner shown. This provides a recess 80 to receive the first end 72 of the column member 70, and the first end 72 is wedged or welded in the recess 80. The column member 70, as configured in FIG. 5, is a tube column which is connected to the spacer member 44 at its first or attachment end 72, and which is tapered at its distal second end 74. The channelway 76 is substantially axially aligned and communicates with the fastener apertures 50 with which it is associated.

The fastener assembly 42 also comprises an enlongated fastener member 82 which has a first end 84, a body portion 86 and a second end 88. The first end 84 has a bolthead configuration and is optionally provided with a washer 90. The second end 88 serves as a self-drilling/self-tapping screw and comprises a drill bit end 92, the body portion 86 having a threaded portion 94 disposed in near proximity to the drill bit end 92.

As depicted in FIG. 5, the fastener member 82 is disposed with its body portion extending through the fastener aperture 50 and the channelway 76. The tapered second end of the tube column 70 partially closes the channelway 76 sufficiently to receive the drill bit end 92 in a friction fit therewith, permitting the distal second end 88 to partially protrude from the end of the channelway 76. This arrangement provides for the retention of the fastener member 82 in an assembled position with the tube column 70 in a ready profile for penetration of the insulation material 36 and for securement to the purlin 14.

If desired, the column member 70 can be provided with internal pressure points to assist in retaining the fastener member 82 in the assembled position, such as is provided by the crimped portion 96 in the column member 70. Once the body portion 86 is positioned in the assembled position depicted in FIG. 5, the column member 70 is crimped at some convenient position clear of the threaded portion 94. Of course, other methods of securing the fastener member 82 within the column member 70 may be practiced, with the object thereof being the securement of the fastener assembly 42 to the beam of the spacer member 44 so that the fastener assembly is maintained in the depicted assembled position until attached to a purlin or other underlaying structural member.

Figure 6:
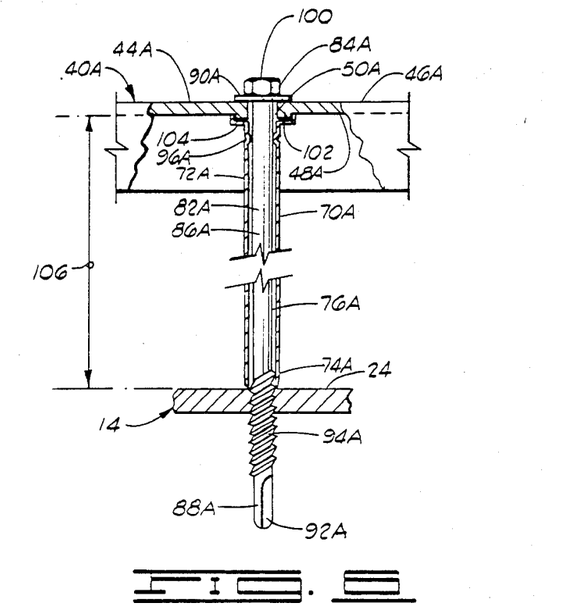
FIG. 6 is a side elevational, partial cutaway view of another fastener assembly constructed in accordance with my invention.

FIG. 6 shows an alternative fastener assembly 100 which is very similar to the fastener assembly 42 shown in FIG. 5, the fastener assembly 100 shown in an attached position with a purlin in FIG. 6. The numeral designations in FIG. 6 having a suffix "A" indicate similar or identical components to those described for the fastener assembly 42. That is, the fastener assembly 100 comprises a column member 70A having a first end 72A, a second end 74A, and a channelway 76A. The fastener assembly 100 is shown assembled to a modified support spacer apparatus 40A which has a plurality of fastener apertures 50A, each of which is identical to the fastener aperture 50 shown in FIG. 5 and each of which has a peripheral ridge 102 extending from the second support surface 48A. The tip 104 of the first end 72A is flared and dimensioned to receive the ridge 102 therewithin, and the column member 70A is secured to the spacer member 44A in any convenient manner, such as by welding or by a friction fit of the ridge 102 and the flared tip 104.

The fastener assembly 100 also comprises an elongated fastener member 82A which is identical to the previously described fastener member 82 and need not be described further herein. As noted, the fastener assembly 100 is shown in its attached position, meaning that the fastener assembly 100 has been actuated to interconnect the support spacer apparatus 40A and the purlin 14 in the manner shown in FIG. 6. That is, the fastener member 82A is shown after it has drilled a hole by forcefully rotating its first or headed end 84A with an appropriately sized wrench while the drill bit end 92A is engaged with the flange 24 of the purlin 14. Once the drill bit end 92A has drilled through the flange 24, the continued rotation of the first end 84A causes the threaded portion 94A to engage the newly drilled hole, and further rotation of the fastener member 82A is performed until the distal, second end 74A of the column member 70A is brought into contact with the flange 24. At this point, the first or headed end 84A of the fastener member 82A and the washer 90A (if provided) have been brought into pressing engagement with the top or first support surface 46A of the support spacer apparatus 40A. This result is effected by determining the dimensional proportions of the fastener assembly 100 such that the threaded portion 94A of the fastener member 82A retains threading engagement with the flange 24 when the second end 74A of the column member 70A comes into pressing engagement with the flange 24. Furthermore, the dimensional proportions of the fastener assembly 100 are established such that the distance 106 between the top surface of the flange 24 and the second support surface 48A of the support spacer apparatus 40A, once the fastener member 82A is adequately tightened to the flange 24, is approximately equal to, or somewhat greater than, the thickness of the insulation blanket 30. Of course, it will be recognized that the dimensional proportions of the fastener assemblies 40, 100 may be altered as desired to accommodate the insulation being installed.

The insulation of the pre-engineered building roof 10 utilizing my invention will now be described beginning at the point in time during the construction of the building that the purlins 14 have been positioned and attached to the rafter members 20. Typically, the insulation blanket will be rolled over the purlins so that one or more widths of the blanket extend continuously from one side of the building to the other side of the building, with each of the widths of insulation passing over the apex of the building. Once in place, each of the widths of insulation blanket is cut to required length and weighted at each of its ends so as to tautly stretch each width of insulation over the rows of purlins. The installing workman, prior to the present invention, would then place roofing panels over the insulation and fasten the panels directly to the purlins in the manner described with reference to FIG. 2A. However, in practice, the installing workman, after placement of the insulation blanket 30 over the purlins 14, would then place a row of interconnected support spacer apparatuses 40 along each purlin in the following manner.

The installation of the roof 10 utilizing my invention will be described with reference to the support spacer apparatus 40 which has been described with reference to FIGS. 3 through 5, and it will be understood that the description will apply as well to the support spacer apparatus 40A of FIG. 6. Each support spacer apparatus 40 will be pre-assembled prior to use with the roof 10; that is, each of the fastener apertures 50 of the support spacer apparatuses will have a fastener assembly 42 associated therewith in the assembled position as depicted in FIG. 5. The first support spacer apparatus 40 to be placed at the edge of the purlin 14 will be generally aligned with the longitudinal axis of the purlin to which it is to be attached and positioned with the drill bit ends 92 of all of its fastener assemblies 42 resting upon the top layer of the insulation 30, the top layer of the insulation 30 being, in most cases, a moisture impregnable vapor barrier which is normally a vinyl film reinforced with some type of fiber. By pressing the support spacer apparatus 40 toward the underlaying purlin 14, the drill bit ends 92 will easily penetrate the insulation and its vapor barrier, causing minimal disturbance to either the insulation or its vapor barrier. As the fastener assemblies 42 are pushed through the insulation 30, the drill bit ends 92 will come to rest on the flange 24 of the purlin 14.

The alignment of the longitudinal axis of the initially placed support spacer apparatus 40 can be achieved visually, or the proper alignment can be determined by the use of an aligning tool (not shown). This aligning tool is placed so as to abut with the end of a purlin, and it should provide an aligning tang protrusion, similar to the protruding tang 56 of the support spacer apparatus 40 shown in FIG. 4, which will be receivable within the channel portion of the second end 54 of the support spacer apparatus initially being positioned on the underlaying purlin 14. Of course, instead of an aligning tool being used to achieve the alignment of the initially positioned support spacer apparatus 40, an aligning tang protrusion can as well be provided by attaching or forming a guide member at one or both ends of each purlin 14, with the guide member having a protruding tang or the like, which serves to guide the placement of the initially positioned support spacer apparatus.

Whether the alignment of the first placed support spacer apparatus on each purlin is visually determined or is determined by reference to an aligning tang protrusion, it is anticipated that the longitudinal alignment of the initial support spacer apparatus 40 will be achieved somewhat simultaneously with pushing the fastener assemblies 42 through the insulation 30. Once the drill bit ends 92 are resting on the flange 24 of the underlaying purlin 14, the longitudinal alignment having been determined, the installer can effect attachment to the flange 24 by applying rotational energy to the fastener members 82 via an appropriate tool in rotating engagement with the headed first end 84 of each of the fastener assemblies 42.

After the initial support spacer apparatus has been attached to a particular purlin 14, the second support spacer apparatus 40 can be easily positioned by placing the channel of its second end 54 over the protruding tang 56 of the first end 52 of the already positioned support spacer apparatus 40. Once this interlocking step is accomplished, the fastener assemblies 42 of the second support spacer apparatus 40 are positioned to extend through the insulation 30 in the manner described for the first placed support spacer apparatus 40. With this completed, the fastener assemblies 42 of the second support spacer apparatus 40 can be tightened to securely attach it to the flange 24. Once attached to the flange 24, the second support spacer apparatus is ready to receive the next support spacer apparatus to be placed in line therewith. These steps are repeated until a row of aligned support spacer apparatuses 40 extend the combined distance of the widths of the insulation 30. In this way, the alignment of the first placed support spacer apparatus 40 serves to guide the placement of the succeeding support spacer apparatuses 40 along the length of the purlin 14. In like manner, a row of support spacer apparatuses 40 is provided for each of the purlins.

Once the support spacer apparatuses 40 are in place, it is a simple matter to position the roof panel member 16 onto the first support surfaces 46 of the installed and aligned support spacer apparatuses 40, and the roof panel members 16 can be attached to the support spacer apparatuses 40 via conventional screw members. In fact, it has been found that the installation of the panel members 16 is made much easier with the use of the support spacer apparatuses 40 constructed in accordance with the present invention. For one thing, the rows of axially aligned support spacer apparatuses 40 attached along the purlins serve as a solid insulation bridge and provides a solid footing for the panel members. Further, these aligned support spacer apparatuses provide the installer with a visual guide to aid in the placement of screw members through the panel members 16, providing him confidence that each screw member used to fasten the roof panel member 16 will be anchored to under-laying solid structural members, which in this case, will be the underlaying support spacer apparatuses 40.

As the fastener assemblies 42 are caused to penetrate the insulation 30, the pre-penetration integrity of the insulation is substantially maintained since the fastener assemblies 42 cause minimal disturbance to the insulation material. Rotational energy applied to the headed ends 84 of the fastener members 82 serve to vibrate the loose insulation fibers, causing the insulation to "fill out", and since the elongated fastener assemblies 42 are relatively small in relation to the supported areas of the support spacer apparatuses 40, the insulation is substantially unchanged from its prepenetration characteristics.

In addition to the above described fastener assemblies 40 and 100, several alternative fastener assemblies will now be described with reference to FIGS. 7 through 9. Since each of these fastener assemblies will be utilized with support spacer apparatuses identical or similar to the support spacer apparatus 40 described above, it will be sufficient to provide some examples of the types of fastener assemblies that, when used in combination with appropriately shaped spacer members, will achieve the objects of my invention.

Figure 7:
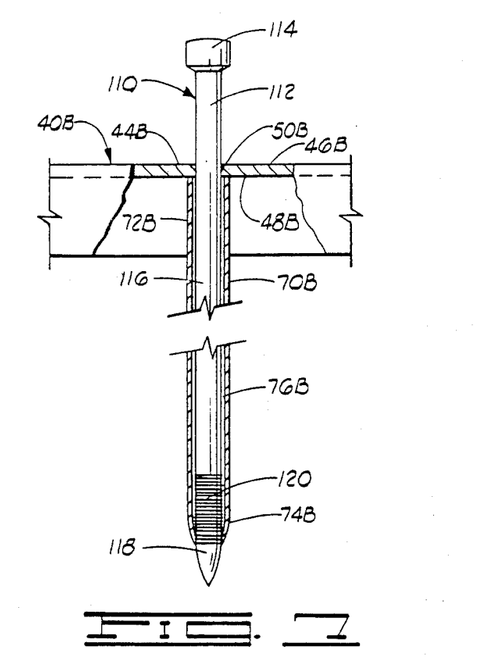
FIG. 7 is a side elevational, partial cutaway view of yet another fastener assembly constructed in accordance with my invention.

In FIG. 7, a support spacer apparatus 40B is shown which has a plurality of fastener apertures 50B, only one of which is shown in the partial view. A fastener assembly 110 is provided, the fastener assembly 110 comprising a column member 70B having a first end 72B, a second end 74B, and a channelway 76B extending from the first end 72B to the distal second end 74B. The fastener assembly 110 also comprises an elongated fastener member 112 which is generally in the form of an enlarged nail, with the fastener member 112 having a headed first end 114, a body portion 116 and a pointed second end 118. The first end 114 generally has a nail head configuration and may be provided with a washer (not shown). The second end 118 serves as a penetrating end for penetrating both the insulation 30 and the flanges 24 of the purlins 14, and the body portion 116 has a ridged portion 120 disposed in near proximity to the tapered or pointed end 118.

As depicted in FIG. 7, the fastener member 112 is disposed with its body portion 116 extending through the fastener aperture 50B and the channelway 76B. The tapered second end 74B of the tube column 70B partially closes the channelway 76B sufficiently to receive the tapered second end 118 in a friction fit therewith, permitting the distal second end 118 to partially protrude from the end of the channelway 76B. This arrangement provides for the retention of the fastener member 112 in an assembled position with the tube column 70B in a ready profile for penetration of the insulation material 30 and for securement to the purlin 14.

In order to secure the column member 70B in the position depicted in FIG. 7 (that is, in its prepenetration position), the tube column 70B can be attached to the second support surface 48B of the support spacer apparatus 40B, or alternatively, the fastener aperture 50B can be dimensioned to receive the body portion 116 of the fastener member 112 in a friction fit to retain the fastener member 112 in the position depicted, in which case there will be no need for attaching the tube column 70B to the spacer member 44B. Additionally, the tube column 70B can be provided with internal pressure points to assist in retaining the fastener member 112 in its assembled position.

The fastener member 112 may be driven into the flange 24 of a purlin 14 by the application of striking force applied to the first end 114; however, it is anticipated that the fastener member 112 can be motivated into a driving engagement with an underlaying purlin by the application of air pressure exerted by a conventional air driver. Once the fastener member 112 is caused to penetrate an underlaying purlin, the first end 114 will be positioned in pressing engagement with the first support surface 46B, the ridge portion 120 will come to rest in locked engagement with the hole provided by the penetration of the second end 118, and the ridge portion 120 will provide resistance to removal of the fastener member 112 from attaching engagement with the penetrated purlin. While the ridges of the ridge portion 120 are shown as circumferential ridges, it will be recognized that other ridge configurations can be utilized. Once the fastener member 112 is driven into the attached position with an underlaying purlin, the tube column 70B will assume the same position as that described above for the tube column 70A depicted in FIG. 6.

Figure 8:
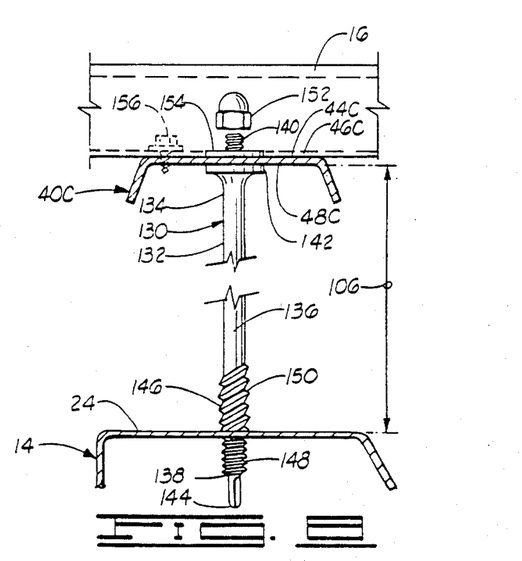
FIG. 8 is a side elevational, partial cutaway view of one other fastener assembly constructed in accordance with my invention.

Another embodiment of a fastener assembly usable in the present invention and designated by the numeral 130 is shown in FIG. 8 in an attached position with the spacer member 44C of the support spacer apparatus 40C and with the underlaying purlin 14. The fastener assembly 130 features integral column and fastener member components, as the fastener assembly 130 comprises a fastener member 132 having a first end 134, a body portion 136 and a second end 138. The first end 134 has a threaded portion 140 that extends through a fastener aperture (not shown) in the spacer member 44C, the diameter of the fastener aperture being large enough to pass the threaded portion 140 but too small to receive the body portion 136. While the body portion of the fastener assembly 130 may serve as the stay member (the column member), a peripherally extensive shoulder portion 142 integrally formed with the body portion 136 may be provided to abut with the second support surface 48C of the spacer member 44C.

The second end 138 of the fastener assembly 130 is shaped in the configuration of a drill bit end 144, and the body portion 136 has a threaded portion 146 adjacent to the drill bit end 144. The threaded portion 146 has a first threaded part 148 and a second threaded part 150, the pitch of the threads of the first threaded part 148 being markedly different than the pitch of the threads of the second threaded part 150.

The cap nut 152 is provided and is threadingly receivable over the threaded portion 140. A washer 154 may be provided for placement on the threaded portion 140 between the cap nut 152 and the first support surface 46C of the spacer member 44C. The threaded bore of the cap nut 152 is dimensioned such that the extreme end of the threaded portion 140 will bottom out therein before the cap nut 152 is pressed into engagement with either the washer 154 or the first support surface 46C, if the washer 154 is not provided. This arrangement assures that the fastener member 132 is rotatable about its longitudinal axis in the fastener aperture of the spacer member 44C when the fastener assembly 130 is assembled thereto.

FIG. 8 shows the roof panel member 16 supported by the support spacer apparatus 40C and attached thereto by a sheet metal screw member 156. Also, the second end 138 of the fastener member 132 is shown attached to the flange 24 of the purlin 14 in the attached position of the fastener assembly 130.

The operation of the fastener assembly 130 of FIG. 8 is very similar to the operation described above for the other fastener assemblies 42, 100 and 110 in that the fastener assembly 130 serves to support the spacer member 44C at a predetermined distance 106 from the flange 24. Once assembled to the spacer member 44C and positioned to extend through insulation (not shown in FIG. 8), the drill bit end 144 is caused to drill a hole through the flange 24 by rotation of the fastener member 132 by the application of rotational energy to the cap nut 152. Of course, it will be recognized that the direction of all of the threads of the fastener assembly 130 must be coordinated such that tightening movement of the cap nut 152 on the threaded portion 140 will drive the other threads in a tightening direction toward the flange 24 and continued rotation of the fastener member 132 will cause the first threaded part 148 to engage the drilled hole. As the rotation continues, the threaded part 148 will move through the hole, having threaded same, and the second threaded part 150 will be caused to engage the threaded hole. Since the threads are pitched differently on the threaded part 150, and may be of larger diameter, the threaded part 150 will be jammed in the hole drilled by the drill bit end 144 and threaded by the threaded part 148. At this point, cross threading will create a large resistance to further rotation, and rotation of the cap nut 152 should be terminated. The dimensional proportions of the fastener assembly 130 are established such that the second support surface 48C will be spatially determined to be at the distance 106 above the flange 24 once all of the fastener assemblies 130 of the support spacer apparatus 40C are so secured.

Figures 9, 10:
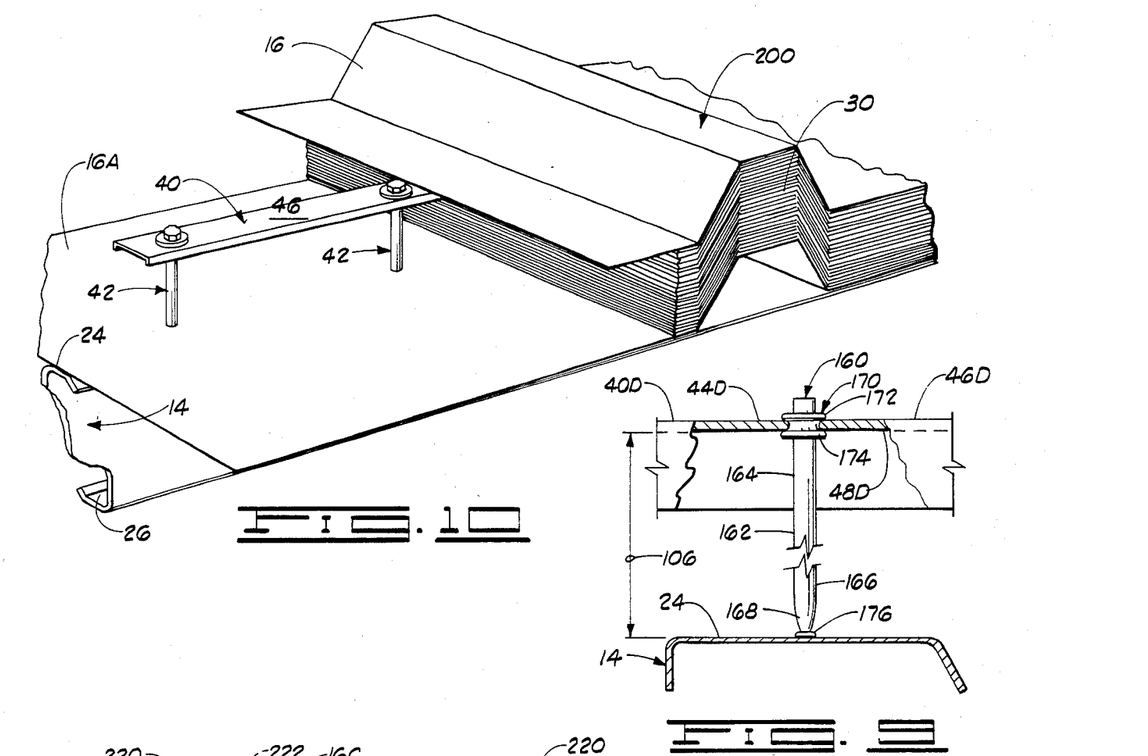
FIG. 9 is a side elevational, partial cutaway view of one other fastener assembly constructed in accordance with my invention.
FIG. 10 is a partial cutaway perspective view of the insulation and paneling apparatus of my invention showing the relative positions of panel members to a secondary structural member of a pre-engineered building.

Yet another embodiment of a fastener assembly for use in my invention and designated by the numeral 160 is shown in FIG. 9 in an attached position with the spacer member 44D and the purlin 14. The fastener assembly 160 comprises an electrically conductive fastener member 162 which has a first end 164, a body portion 166 and a tapered second end 168. The first end 164 extends through the fastener aperture (not shown) of the spacer member 44D, and an insulator ring 170 is adhered to the first end 164, the insulator ring 170 being disposed to fill the fastener aperture while having oversized external ridge portions 172 and 174 extending from the fastener aperture to configure the insulator ring 170 in the general shape of a grommet. However, the insulator ring 170 is also adhered to the spacer member 44D both within the fastener aperture and at the first and second support surfaces 44D, 46D by the overlaping of the external ridge portions 172 and 174. The insulator ring 170, which may be an epoxy material with suitable insulative qualities, serves to secure the fastener member 162 to the spacer member 44D, and it also serves as a stay member to exert upward force against the second support surface 48D in the attached position of the fastener assembly 160.

The operation of the fastener assembly 160 when assembled to the spacer member 44D is as follows. Once the support spacer apparatus 40D is positioned so as to extend the fastener assemblies 160 thereof through the insulation 30 (not shown in FIG. 9) so that the tapered second ends 168 contact the flange 24 of the underlaying purlin 14, each of the fastener assemblies 160 becomes an electrode and a weld bond 176 is formed between the second end 168 and the flange 24 by the application of electrical energy to the first end 164 which is extensive above the first support surface 46D. The tapered second ends 168, in addition to aiding penetration of the insulation, also serve to increase the electrical resistance at the points of contact with the flange 24, and upon passage of a welding current, cause the fasteners to heat and fuse to the underlying structural member at the tips of the fastener assemblies 160. To accomplish the welding, a conventional welding apparatus can be utilized, and the fastener assemblies 160 of a support spacer apparatus 40D can be welded one at a time, or all at the same time by electrically interconnecting the extensive ends 164 of the fastener assemblies 160.

FIG. 10 depicts in isometric view a further embodiment of my above-described invention. In many ways, the embodiment shown in FIG. 10 is similar to that shown and described for FIG. 3 hereinabove. That is, a portion of insulation material 30 is shown over the upper flange 24 of a purlin 14. A portion of the support spacer apparatus 40 is shown, along with a portion of the roof panel member 16 depicted above the support spacer apparatus 40 which is fastened to the flange 24 of the purlin 24 by the fastener assemblies 42. The fastener assemblies 42, along with the other mentioned components shown in FIG. 10, were described fully hereinabove and need not be described further.

The difference in the embodiment of FIG. 10 to that of FIG. 3 is that another roof panel 16A is positioned over the flange 24 of the underlying purlin 14. In new construction, the panel 16A, similar or identical to the panel 16, will be laid directly over the flange 24 of the purlin 14, and conventional fasteners (not shown) may be used to secure the panel 16A in place, or the securement may be effected by the attaching function of the fasteners 42. In retrofit operations, the panel 16A represents a previously existing building panel roof or other type of substrate (such as a built up roof).

In FIG. 10, the panel member 16A is first attached to the building frame (that is, the underlying building substrate represented by a purlin system or some other substrate system). A layer of compressible insulation 30 is disposed over, or adjacent to, the panel member 16A, and the necessary number of support spacer apparatuses 40 are disposed to overly the insulation 30 with the insulation penetrating fastener assemblies 42 secured directly to the underlying building frame. Normally, it will not be necessary that clearance holes be drilled in the underlying panel member 16A; rather, the fastener assemblies 42 will penetrate the panel member 16A directly as attachment to the building frame is achieved in the manner described hereinabove for the support spacer apparatuses 40.

The underlying roof panel member 16A may be corrugated or it may be flat. If corrugated in the same pattern as the panel member 16, the insulation batting 30 will easily conform as necessary to the shape of the space between the two panel members 16, 16A by aligning the corrugation patterns as at 200 in FIG. 10.

Figure 11A:
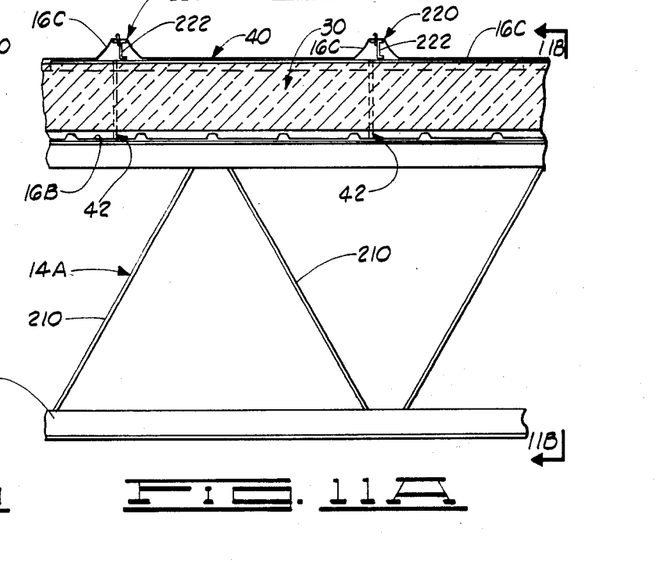
FIG. 11A shows a side elevational view of a portion of another embodiment of my insulation and paneling apparatus as applied over a roof decking supported by a bar joist building frame.
Figure 11B:
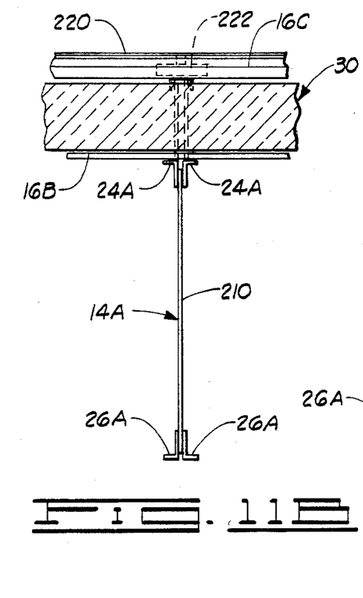
FIG 11B is a cross sectional view taken at 11B—11B in FIG. 11A.

FIGS. 11A and 11B depict, respectively, side elevational and cross sectional views of my invention as applied over a roof which is composed of roof decking 16B supported by the upper flanges 24A of a conventional bar joist 14A. The bar joist 14A has upper flange memers 24A and lower flange members 26A spatially disposed in parallel relationship by interconnecting bars 210. In the manner described above for FIG. 20, insulation 30 is laid on top of the decking 16B; support spacer apparatuses 40 are disposed to overlay and penetrate the insulation 30; the fastener assemblies 42 are secured to the underlying bar joist 14A (again, the fastener assemblies 42 will normally penetrate the decking 16B, which is corrugated sheet metal panels, and attach directly to the underlying bar joists 14A); and roof panel members 16C are placed over the support spacer apparatuses 40 and attached thereto. Conventional fasteners may be used to attach the roof panel members 16C to the support spacer apparatuses 40. In the case shown in FIGS. 11A, 11B, the roof panel members 16C may be conventional standing seam panel members which are joined at overlapping seams 220. The overlapping seams 220 in turn overlap and attach to clips 222 which are secured to the support spacer apparatuses 40 via conventional fasteners (not shown).

While the embodiments described and shown in FIGS. 10, 11A and 11B disclose my invention as being used as building roofs, it will be appreciated that my invention can also be applied to wall structures. My invention finds applications both in new construction, and in retrofit construction where repair or replacement work is involved. While my invention has been described wherein the support spacer apparatuses 40 are attached via the fastener assemblies 42 directly to the building frame underlying the panel beneath the insulation, there will be applications in which sufficient substrate material texture will exist wherein the fastener assemblies 42 will be secured to the substrate without attachment to the building frame. For example, where the underlying panel members 16A or the roof decking 16B have sufficient strength, the fastener assemblies 42 can be secured to these members. There will also be applications in which some of the fastener assemblies 42 will be attached to the underlying building frame and other of the fastener assemblies 42 will be attached to pre-existing roof substrate or to newly laid roof panel members. The versatility of my insulation and paneling apparatus and method is thus apparent.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved insulation and paneling apparatus for enclosing a building having a building frame comprising:
   a first panel member supported by the building frame;
   at least one insulation batting disposed to extend substantially adjacent to the first panel member;
   a spacer member having a first support surface and an opposite second support surface;
   fastener means for attaching the spacer member to a selected one of the first panel member and the building frame, the fastener means comprising:
      a plurality of discreet column members connected to the spacer member before installation of the spacer member, the column members being shaped to penetrate a compressible material so that the characteristics of the insulation are substantially retained during the penetration of the insulation by the column members, each column member maintainable substantially in nonpenetrating engagement with the first panel member in the installed position of the spacer member; and
      a plurality of fastener members attachable to the selected one of the first panel member and the building frame so that the column members are disposed between the spacer member and the first panel member, the first support surface being thereby disposed a predetermined distance from the first panel member, each fastener member attachable to the selected one of the first panel member and the building frame by the application of energy to one end of the fastener member to cause attachment of the other end of the fastener member;
   a second panel member supported on the first support surface; and
   attaching means for attaching the second panel member to the spacer member.

2. The apparatus of claim 1 wherein each of the column members is a tube column having a channelway extending from an attachment end thereof to a tapered distal end thereof, and wherein each fastener member is disposed to extend through the channelway of a respective tube column, each of the tube columns attached at its attachment end to the spacer member.

3. The apparatus of claim 2 wherein the spacer member has a plurality of fastener apertures and wherein each of the fastener members comprises a screw member having a first end and a second end, and the first end having a bolthead configuration, the second end being a self-drilling/self-tapping screw, the screw member being of a length determined to effect compressive force upon its respective tube column member when the screw member is disposed through one of the fastener apertures and caused to be attached.

4. The apparatus of claim 2 wherein the spacer member has a plurality of fastener apertures and each of the fastener members comprises a screw member having a first end, a second end and a body portion, the first end having a bolthead configuration, the second end being configured as a drill bit, and the body portion having screw threads disposed in near proximity to the second end, the screw member being of a length determined to effect compressive force upon its respective tube column member when the screw member is disposed to extend through one of the fastener apertures and caused to be attached.

5. The apparatus of claim 2 wherein the spacer member has a plurality of fastener apertures and each of the fastener members comprises a nail member having a first end and a second end, the first end substantially having a nailhead configuration, and the second end tapered to a penetrating point, the nail member being of a length determined to restrain its respective tube column member when the nail member is disposed to extend through one of the fastener apertures and caused to be penetratingly attached by energy applied to the first end thereof.

6. The apparatus of claim 5 wherein each of the nail members is dimensioned to be received in the channelway of its respective tube column member by a friction fit so that the tube column member is supported by the nail member and extensive from the second support surface prior to the nail member being caused to be penetratingly attached.

7. The apparatus of claim 3, 4, 5 or 6 wherein each of the fastener apertures of the spacer member is tubulated and each of the column members is connected to the tubulation of its respective fastener aperture.

8. The apparatus of claim 3, 4, 5 or 6 wherein each of the column members is weldingly attached to the second support surface of the spacer member so that its respective channelway is substantially axially aligned with the respective fastener aperture.

9. The apparatus of claim 1, 2, 3, 4, 5 or 6 wherein the spacer member is a channel member having a first end and a second end, a portion of the first end being shaped to be receivable by the second end of another spacer member disposed in end-to-end alignment with the spacer member.

10. The apparatus of claim 1, 2, 3, 4, 5 or 6 wherein the second panel member is a standing seam roof panel and wherein the attaching means is a clip which is fastened to the spacer member and positioned for attachment to the standing seam roof panel.

11. An improved insulation and paneling apparatus for enclosing a building having a building frame comprising:

a first panel member supported by the building frame;

at least one insulation batting disposed to extend substantially adjacent to the first panel member;

a spacer member having a first support surface and an opposite second support surface, the spacer member having a plurality of fastener apertures communicating therethrough;

fastener means for attaching the spacer member to a selected one of the first panel member and the building frame, the fastener means comprising:

a plurality of discreet column members connected to the spacer member and extensive from the second support surface, each column member maintainable substantially in nonpenetrating engagement with the first panel member in the installed position of the spacer member; and a plurality of fastener members extendable through the fastener apertures and attachable to the selected one of the first panel member and the building frame so that the column members are disposed between the spacer member and the first panel member, the first support surface being thereby disposed a predetermined distance from the first panel member, each fastener member attachable to the selected one of the first panel member and the building frame at any location overlain by its corresponding fastener aperture in the spacer member by the application of energy to one end of the fastener member to cause attachment of the other end of the fastener member;

a second panel member disposed on the first support surface; and attaching means for attaching the second panel member to the spacer member.

12. The apparatus of claim 11 wherein the column members are shaped to penetrate a compressible material so that the characteristics of the insulation are substantially retained during the penetration of the column members.

13. The apparatus of claim 12 wherein each of the column members is a tube column having a channelway extending from an attachment end thereof to a tapered distal end thereof, and wherein each fastener member is disposed to extend through the channelway of a respective tube column, each of the tube columns attached at its attachment end to the spacer member.

14. The apparatus of claim 13 wherein each of the fastener members comprises a screw member having a first end and a second end, and the first end having a bolthead configuration, the second end being a self-drilling/self-tapping screw, the screw member being of a length determined to effect compressive force upon its respective tube column member when the screw member is disposed through one of the fastener apertures and caused to be attached.

15. The apparatus of claim 13 wherein each of the fastener members comprises a screw member having a first end, a second end and a body portion, the first end having a bolthead configuration, the second end being configured as a drill bit, and the body portion having screw threads disposed in near proximity to the second end, the screw member being of a length determined to effect compressive force upon its respective tube column member when the screw member is disposed to extend through one of the fastener apertures and caused to be attached.

16. The apparatus of claim 13 wherein each of the fastener members comprises a nail member having a first end and a second end, the first end substantially having a nailhead configuration, and the second end tapered to a penetrating point, the nail member being of a length determined to restrain its respective tube column member when the nail member is disposed to extend through one of the fastener apertures and caused to be penetratingly attached by energy applied to the first end thereof.

17. The apparatus of claim 16 wherein each of the nail members is dimensioned to be received in the channelway of its respective tube column member by a friction fit so that the tube column member is supported by the nail member and extensive from the second support surface prior to the nail member being caused to be penetratingly attached.

18. The apparatus of claim 11, 12, 13, 14, 15, 16 or 17 wherein each of the fastener apertures of the spacer member is tubulated and each of the column members is connected to the tubulation of its respective fastener aperture.

19. The apparatus of claim 11, 12, 13, 14, 15, 16 or 17 wherein each of the column members is weldingly attached to the second support surface of the spacer member so that its respective channelway is substantially axially aligned with the respective fastener aperture.

20. The apparatus of claim 11, 12, 13, 14, 15, 16 or 17 wherein the spacer member is a channel member having a first end and a second end, a portion of the first end being shaped to be receivable by the second end of another spacer member disposed in end-to-end alignment with the spacer member.

21. The apparatus of claim 11, 12, 13, 14, 15, 16, or 17 wherein the second panel member is a standing seam roof panel and wherein the attaching means is a clip which is fastened to the spacer member and positioned for seam rolling attachment to the standing seam roof panel.

22. An improved insulation and paneling method for enclosing a building having a building frame, comprising:

attaching at least one first panel member to the building frame;

disposing at least one layer of compressible insulation adjacent to the first panel member;

supporting a second panel member a predetermined distance from the first panel member with a spacer member having a first support surface and an opposite second support surface, a plurality of column members connected to the spacer member and extensive from the second support surface before installation of the spacer member, the column members being shaped to penetrate a compressible material so that the characteristics of the insulation are substantially retained during the penetration of the insulation by the column members, each column member maintainable substantially in nonpenetrating engagement with the first panel member in the installed position of the spacer member; and attaching the spacer member to a selected one of the building frame and the first panel member by a plurality of fastener members attachable to the selected one of the first panel member and the building frame so that the column members are disposed between the spacer member and the first panel member, each fastener member attachable to the selected one of the first panel member and the building frame by the application of energy to one end of the fastener member to cause attachment of the other end of the fastener member thereto.

23. The method of claim 22 wherein the second panel member is a standing seam roof panel and wherein the second panel member is attached to the spacer member by forming a seam portion thereof in seaming engagement to at least one clip supported by the spacer member.

24. An improved insulation and paneling method for enclosing a building having a building frame, comprising:

attaching at least one first panel member to the building frame;

disposing at least one layer of compressible insulation adjacent to the first panel member;

attaching at least one spacer member to a selected one of the first panel member and the building frame, the spacer member having a first support surface and an opposite second support surface, the spacer member having a plurality of fastener apertures communicating therethrough, a plurality of discreet column members connected to the spacer member and extensive from the second support surface, each column member maintainable substantially in nonpenetrating engagement with the first panel member in the installed position of the spacer member, and a plurality of fastener members extendable through the fastener apertures and attachable to the selected one of the first panel member and the building frame so that the column members are disposed between the spacer member and the first panel member, the first support surface being thereby disposed a predetermined distance from the first panel member, each fastener member attachable to the selected one of the first panel member and the building frame at any location overlain by its corresponding fastener aperture in the spacer member by the application of energy to one end of the fastener member to cause attachment of the other end of the fastener member; and attaching at least one second panel member to the spacer member.

25. The method of claim 24 wherein the second panel member is a standing seam roof panel and wherein the second panel member is attached to the spacer member by rolling a seam portion thereof in seaming engagement to at least one clip supported by the spacer member.

26. An improved reroofing method for building a new roof over a previously existing roof supported by the underlying frame of the building, the method comprising:

disposing at least one layer of compressible insulation over the previously existing roof;

attaching at least one spacer assembly to a selected one of the previously existing roof and the building frame, the spacer assembly comprising a spacer member having a first support surface and an opposite second support surface, the spacer assembly comprising a means of spacing the first support surface from the existing roof a predetermined distance, said means comprising a plurality of column members connected to the spacer member and extensive from the second support surface before installation of the spacer member, the column members being shaped to penetrate a compressible material so that the characteristics of the insulation are substantially retained during the penetration of the insulation by the column members, each column member maintainable substantially in nonpenetrating engagement with the previously existing roof in the installed position of the spacer member, and a plurality of fastener members attachable to the selected one of the previously existing roof and the building frame, the first support surface being thereby disposed the predetermined distance from the previously existing roof, each fastener member attachable to the selected one of the previously existing roof and building frame by the application of energy to one end of the fastener member to cause attachment of the other end of the fastener member thereto; and attaching at least one panel member to the spacer member.

27. The method of claim 26 wherein the panel member is a standing seam roof panel and wherein the second panel member is attached to the spacer member by forming a seam portion thereof in seaming engagement to at least one clip supported by the spacer member.

28. An improved reroofing method for building a new roof over a previously existing roof supported by the underlying frame of the building, the method comprising:

disposing at least one layer of compressible insulation over the previously existing roof;

attaching at least one spacer member to a selected one of the previously existing roof and the building frame, the spacer member having a first support surface and an opposite second support surface, the spacer member having a plurality of fastener apertures communicating therethrough, a plurality of discreet column members connected to the spacer member and extensive from the second support surface, each column member maintainable substantially in nonpenetrating engagement with the previously existing roof in the installed position of the spacer member, and a plurality of fastener members extendable through the fastener apertures and attachable to the selected one of the previously existing roof and the building frame, the first support surface being thereby disposed a predetermined distance from the previously existing roof, each fastener member attachable to the selected one of the previously existing roof and building frame at any location overlain by its corresponding fastener aperture in the spacer member by the application of energy to one end of the fastener member to cause attachment of the other end of the fastener member; and attaching at least one panel member to the spacer member.

29. The method of claim 28 wherein the panel member is a standing seam roof panel and wherein the second panel member is attached to the spacer member by rolling a seam portion thereof in seaming engagement to at least one clip supported by the spacer member.

* * * * *

UNITED STATES PATENT AND TRADEMARK OFFICE
CERTIFICATE OF CORRECTION

PATENT NO. : 4,516,371

DATED : May 14, 1985

INVENTOR(S) : Harold G. Simpson

It is certified that error appears in the above-identified patent and that said Letters Patent is hereby corrected as shown below:

In column 14, line 57, the word "memers" should read --members--; in column 14, line 59, the numeral "20" should read --10--.

Signed and Sealed this

Eleventh Day of February 1986

[SEAL]

Attest:

DONALD J. QUIGG

Attesting Officer

Commissioner of Patents and Trademarks